United States Patent [19]
Fraser

[11] Patent Number: 5,829,303
[45] Date of Patent: Nov. 3, 1998

[54] METHOD AND APPARATUS FOR MEASURING A LIQUID LEVEL USING A LIQUID LEVEL GAUGE HAVING REED SWITCHES TO DETERMINE THE POSITION OF A MAGNETIC FLOAT

[76] Inventor: George David Fraser, 1 Garnet Avenue, Sherwood Park, Alberta, Canada, T8A 3J5

[21] Appl. No.: 667,281

[22] Filed: Jun. 20, 1996

[51] Int. Cl.$^6$ .............................. G01F 23/62; G01F 23/76; H01H 35/18
[52] U.S. Cl. .............................. 73/319; 73/313; 73/322.5; 73/DIG. 5; 200/84 C; 335/206; 335/207
[58] Field of Search .......................... 73/319, 313, 322.5, 73/DIG. 5; 200/84 C; 335/206, 207

[56] References Cited

U.S. PATENT DOCUMENTS

| | | | |
|---|---|---|---|
| 3,976,963 | 8/1976 | Kubler | 73/313 |
| 4,056,979 | 11/1977 | Bongort et al. | 73/313 |
| 4,466,284 | 8/1984 | Dumery | 73/313 |
| 4,730,491 | 3/1988 | Lew | 73/313 |
| 4,955,231 | 9/1990 | Mahoney | 73/319 |
| 5,103,673 | 4/1992 | Sawada et al. | 73/322.5 |
| 5,347,864 | 9/1994 | Senghaas et al. | 73/319 |

FOREIGN PATENT DOCUMENTS

| | | | |
|---|---|---|---|
| 0027949 | 2/1980 | Japan | 73/313 |
| 0257223 | 10/1989 | Japan | 73/313 |
| 0469890 | 8/1975 | U.S.S.R. | 73/313 |
| 0614332 | 7/1978 | U.S.S.R. | 73/313 |

*Primary Examiner*—Diego F. F. Gutierrez
*Attorney, Agent, or Firm*—Anthony R. Lambert

[57] ABSTRACT

A method and apparatus for measuring a liquid level using a liquid level gauge having reed switches to determine the position of a magnetic float. Firstly, providing an elongate float having an axial bore defining a longitudinal axis. The float has a plurality of magnets axially spaced along the longitudinal axis to form magnetic layers. Secondly, providing a tube having a first end and a second end. A plurality of magnetically activated reed switches are equally axially spaced from the first end to the second end. The tube extends through the axial bore of the float. Thirdly, determining which of the plurality of magnetically activated reed switches have been activated by the axially spaced magnetic layers of the float and interpolating float position in relation to the activated reed switches.

6 Claims, 3 Drawing Sheets

METHOD AND APPARATUS FOR MEASURING A LIQUID LEVEL USING A LIQUID LEVEL GAUGE HAVING REED SWITCHES TO DETERMINE THE POSITION OF A MAGNETIC FLOAT

FIELD OF THE INVENTION

The present invention relates to a method of increasing the accuracy of a liquid level gauge having reed switches to determine a position of a magnetic float, and a liquid level gauge.

BACKGROUND OF THE INVENTION

Liquid level gauges that utilize cables or optical sensors to determine float position, are incapable of operating effectively over a prolonged period of time in a corrosive environment. When cables are used, the corrosive environment corrodes the cables and associated hardware. Ultimately, the cables fail or jam due to debris buildup and wear. When optical sensors are used, a translucent coating develops on the components, blocking light and adversely effecting accuracy.

The drawbacks inherent with other means for determining float position have been overcome using reed switches. A linear series of reed switches are arranged inside a tube mounted vertically within a tank. A magnetic donut shaped float is positioned around the tube; rising and falling with liquid levels. Movement of the magnetic donut engages various reed switches. The reed switches are wired in a resistor array so that changes in liquid levels, change the total resistance of the array. This resistance is measured and is used to calculate liquid levels.

When reed switches are used to determine a position of a magnetic float, in the manner described, at least one reed switch is required for each point to be measured. In applications in which a high degree of accuracy is required, this makes the technology very expensive.

SUMMARY OF THE INVENTION

What is required is a method of using reed switches to determine a position of a magnetic float in which fewer reed switches are required than the number of points to be measured.

According to one aspect of the present invention there is provided a method of increasing the accuracy of a liquid level gauge having reed switches to determine a position of a magnetic float. Firstly, providing an elongate float having an axial bore defining a longitudinal axis. The float has a plurality of magnets axially spaced along the longitudinal axis to form magnetic layers. Secondly, providing a tube having a first end and a second end. A plurality of magnetically activated reed switches are equally axially spaced from the first end to the second end. The tube extends through the axial bore of the float. Thirdly, determining which of the plurality of magnetically activated reed switches have been activated by the axially spaced magnetic layers of the float and interpolating float position.

As will hereinafter be further described, the above described method enables the precise positioning of the float to be determined relative to the reed switches. This enables fewer reed switches to be used than the number of points to be measured.

According to another aspect of the present invention there is provided a liquid level gauge including an elongate float having an axial bore defining a longitudinal axis. The float has a plurality of magnets axially spaced along the longitudinal axis to form magnetic layers. A tube is provided having a first end and a second end. A plurality of magnetically activated reed switches are equally axially spaced from the first end to the second end. The tube extends through the axial bore of the float. Means is provided for determining which of the plurality of magnetically activated reed switches have been activated by the axially spaced magnetic layers of the float. Once the activated reed switches are known, the float position can be accurately interpolated.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
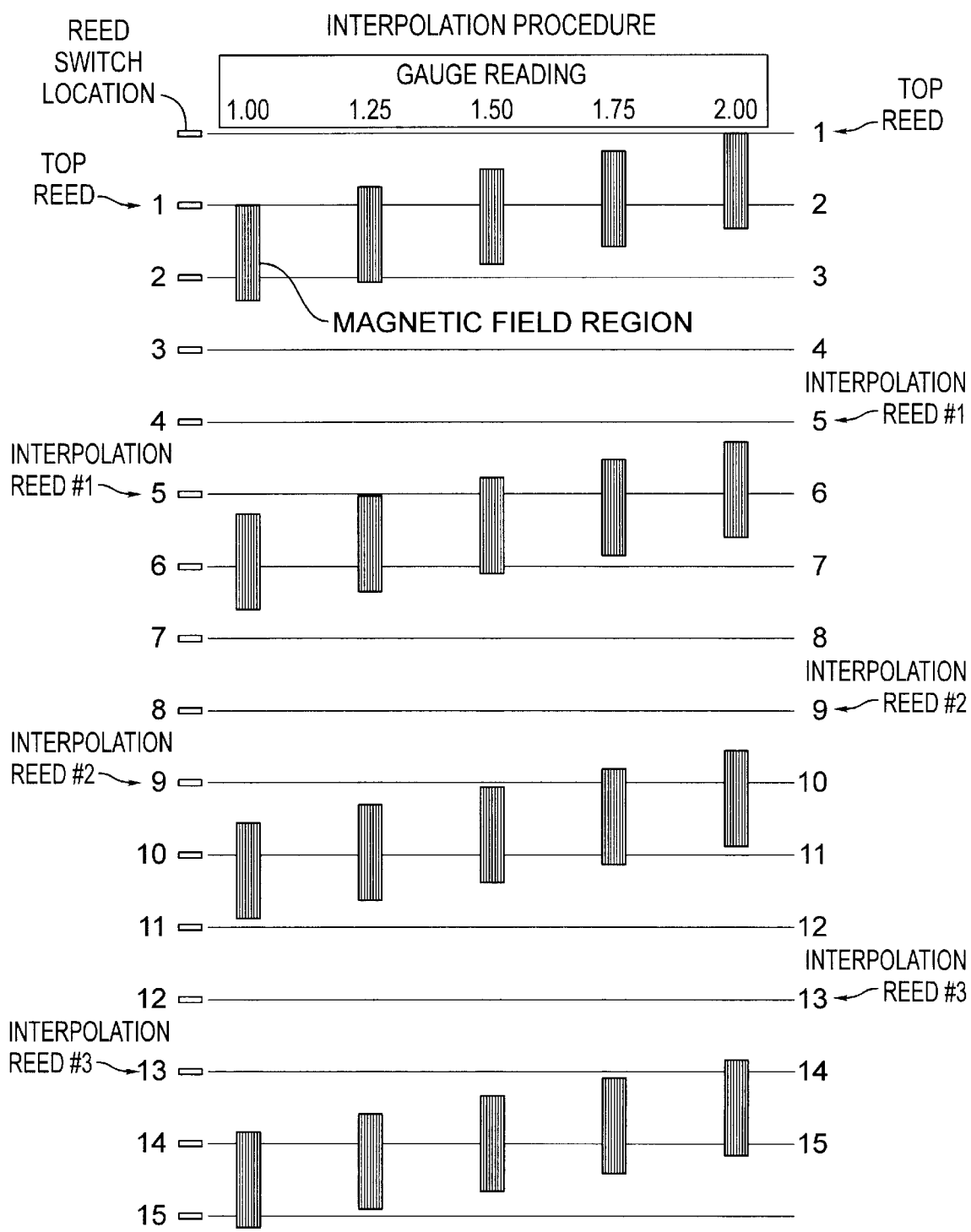
FIG. 2 is a chart setting forth a preferred method of interpolating float position.
Figure 3:
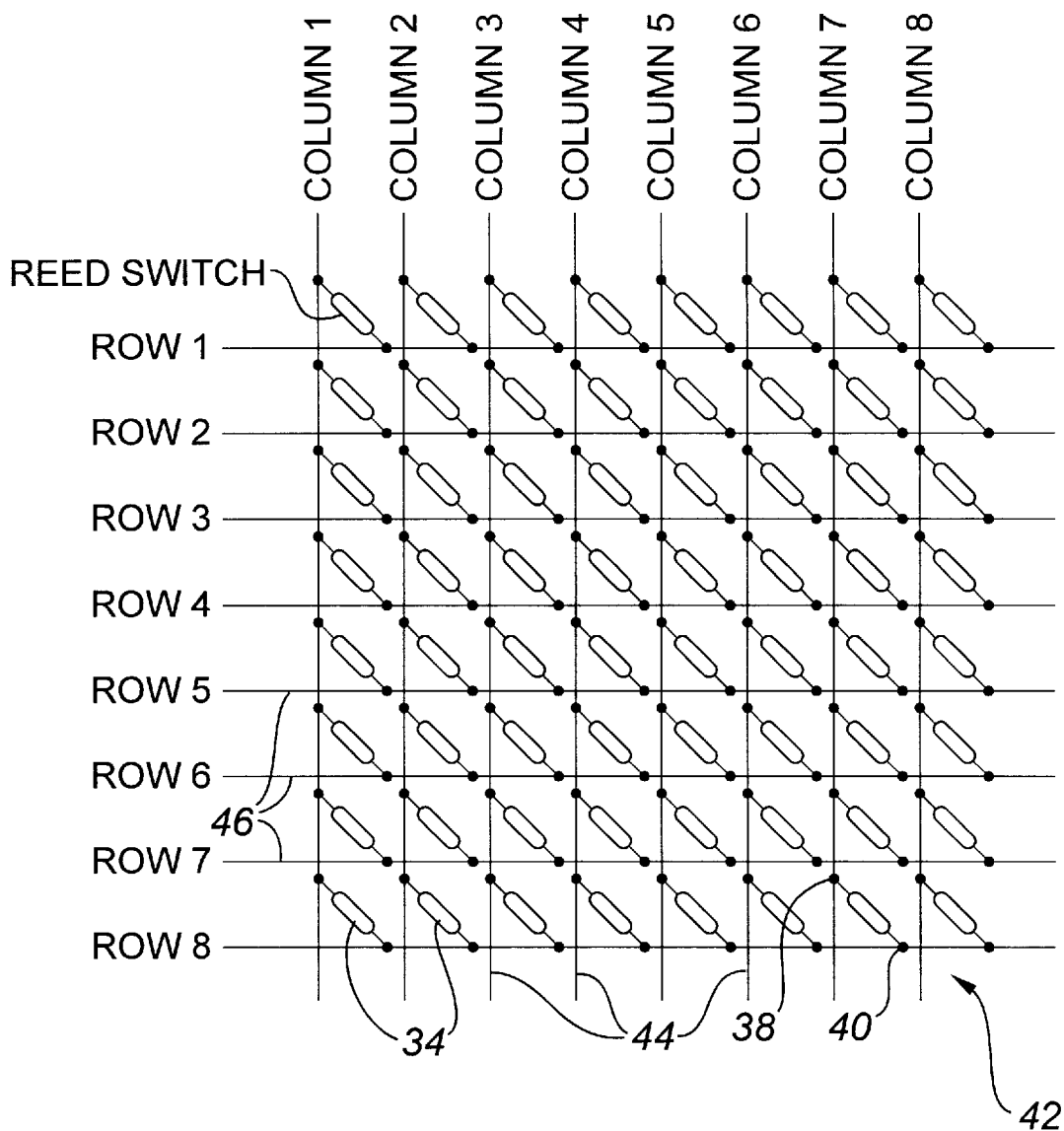
FIG. 3 is a chart setting forth a preferred method of monitoring reed switch activation.

The preferred embodiment, a liquid level gauge generally identified by reference numeral 10, will now be described with reference to FIGS. 1 through 3.

Figure 1:
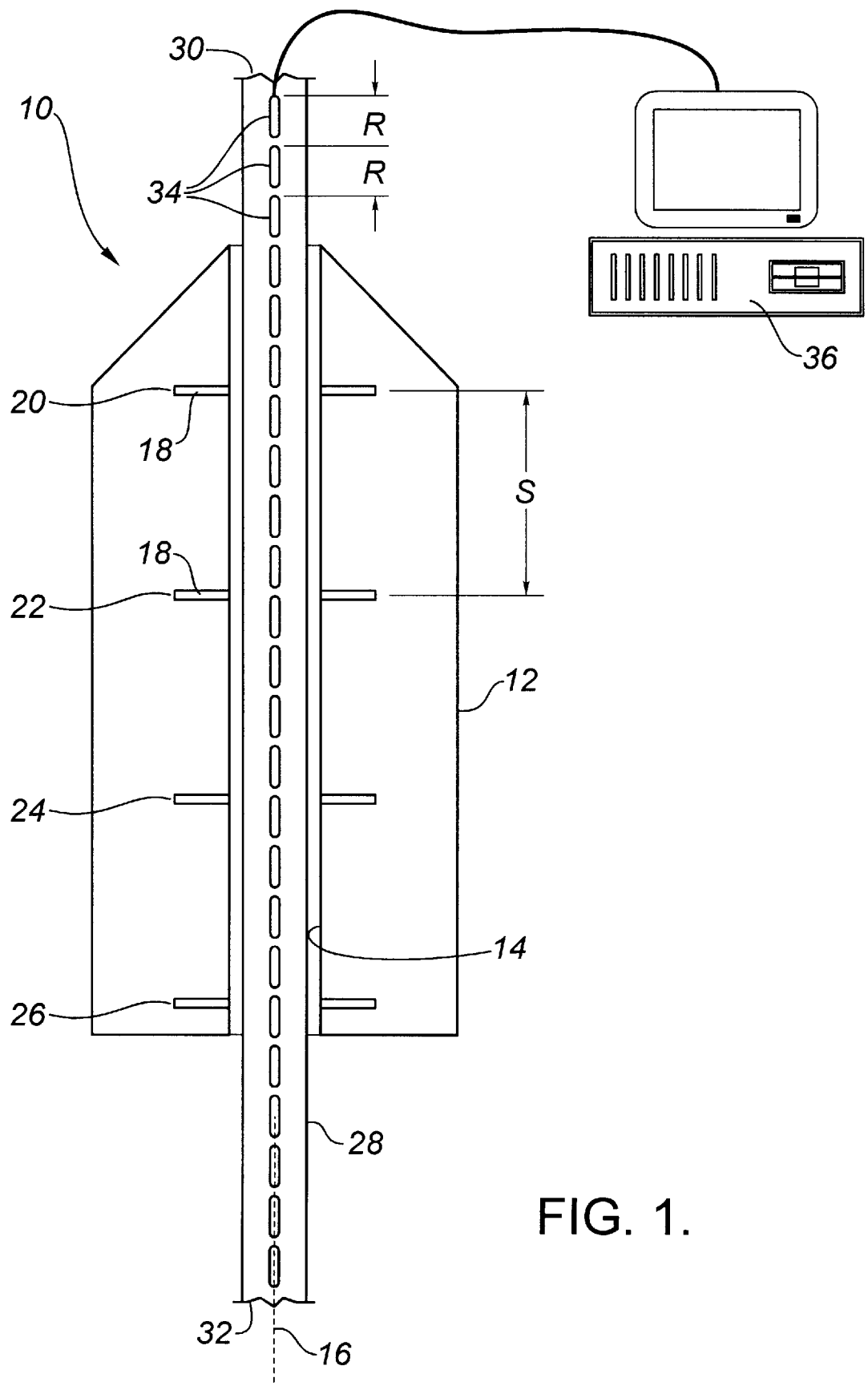
FIG. 1 is a side elevation view, in section, of a liquid level gauge constructed in accordance with the teachings of the present invention.

Referring to FIG. 1, liquid level gauge 10 includes an elongate float 12 having an axial bore 14 which defines a longitudinal axis, generally indicated by reference numeral 16. Float 12 has a plurality of magnets 18 axially spaced along longitudinal axis 16 to form magnetic layers or decks 20, 22, 24, and 26. A tube 28 is provided having a first end 30 and a second end 32. A plurality of magnetically activated reed switches 34 are equally axially spaced from first end 30 to second end 32. Tube 28 extends through axial bore 14 of float 12. A computer 36 is used as means for determining which of the plurality of magnetically activated reed switches 34 have been activated by axially spaced magnetic layers or decks 20, 22, 24, and 26 of float 12. Once it is known which of reed switches 34 have been activated, the position of float 12 can be accurately interpolated as will hereinafter be further described in relation to the method.

The preferred method of determining float positioning will now be described. Firstly, provide float 12, as described. Secondly, providing tube 28, as described, and positioning float 12 and tube 28 in position within a liquid tank (not shown) with tube 28 positioned vertically and extending through axial bore 14 of float 12. Thirdly, determining which of the plurality of magnetically activated reed switches 34 have been activated by axially spaced magnetic layers or decks 20, 22, 24, and 26 of float 12. Referring to FIG. 2, an example of how the positioning of float 12 may be determined by interpolating data regarding which reed switches 34 have been activated will now be described. Computer 36 determines which of reed switches 34 has been engaged by magnetic layer 20. This will always reflect the highest of reed switches 34 that has been engaged. It then engages in an interpolation procedure to determine the position of float 12 relative to that highest or top reed position. In the example illustrated in FIG. 1, reed switches 34 are spaced 1 inch apart. Magnetic layers or decks 20, 22, 24, and 26 of float 12 are spaced 4¼ inches apart. The four magnetic layers divide the 1 inch spacing into 4 increments, allowing for an accuracy of within ¼ of an inch. The manner in which these spacings have been determined will hereinafter be further described. Referring to FIG. 2, computer 36 starts the interpolation procedure by checking three interpolation positions corresponding to magnetic layers 22, 24, and 26. In this particular configuration, each of the interpolation positions is 4 reed switches apart. If the top reed switch activated is designated as reed switch #1, computer 36 checks to see if reed switch #5 has been activated by magnetic layer 22, if reed switch #9 has been activated by magnetic layer 24, and if reed switch #13 has been activated by magnetic layer 26. If reed switch #1 is activated, but reed switches #5, #9 and #13 have not; the top reed switch activated represents a true liquid level reading. If reed switch #1 is activated by magnetic layer 20, and reed switch #5 is activated by magnetic layer 22, but reed switches #9 and #13 have not been activated; the computer determines by interpolation that the float position is between reed switches and is 0.25 of an inch higher than the top reed switch. If reed switch #1 is activated by magnetic layer 20, reed switch #5 activated by magnetic layer 22, and reed switch #9 is activated by magnetic layer 24, but reed switch #13 has not been activated; the computer determines by interpolation that the float position is between reed switches and is 0.50 of an inch higher than the top reed switch. If reed switch #1 is activated by magnetic layer 20, reed switch #5 activated by magnetic layer 22, and reed switch #9 is activated by magnetic layer 24, and reed switch #13 is activated by magnetic layer 26; the computer determines by interpolation that the float position is between reed switches and is 0.75 of an inch higher than the top reed switch. If the liquid level were to rise by a further 0.25 of an inch, a new top reed switch would be established and all of the interpolation positions would change accordingly.

It can be seen with this description how the method and apparatus describes enables one to have an accuracy of within 0.25 of an inch, while maintaining a spacing between reed switches 34 of 1 inch. The number of magnetic layers chosen depends upon the accuracy desired. The methodology can work with as few as two magnetic layers. Once the number of magnetic layers have been chosen, the determination of the spacing of those magnetic layers can be determined with the following formula.

$$S=(n \times R)+(R/d)$$

where

S=spacing of magnetic layers or decks n=is a whole number representing a distance sufficient to avoid magnetic interaction of the magnets R=reed spacing d=selected number of layers or decks In the example provided, rs was 1 inch. The distance n, selected to avoid interaction of the magnets was 4. The number of layers or decks was 4, chosen because an accuracy of 0.25 was desired. When these numbers are included in the formula, the spacing of the magnetic layers or decks arrived at is 4¼ inches.

$$s=(4 \times 1)+(¼)$$

$$s=4¼$$

The manner that computer 36 determines which of reed switches 34 have been activated will now be described. Referring to FIG. 3, each of reed switches 34 has a two electrical terminals 38 and 40. The electrical terminal connections of reed switches 34 are arranged in the form of a matrix, generally indicated by reference numeral 42. Matrix 42 consists of a plurality of columns 44 and rows 46. Terminal 38 of each of reed switches 34 is connected to one of columns 44. Terminal 40 of each of reed switches 34 is connected to one of rows 46. In the illustrated embodiment eight rows and eight columns have been used. With this configuration, each of reed switches 34 has a unique "address" consisting of a column number and a row number. When a reed switch 34 is not activated, it is an electrical open circuit. When a reed switch 34 is activated, it is an electrical closed circuit. To determine which reed switches 34 have been activated, a signal is applied to each of columns 44, in turn. Concurrently, rows 46 are monitored to see if the signal initiated in one of columns 44 appears. Only one of columns 44 has a signal applied at any one time. Those rows in which the signal appear indicate the column and row "address" for the reed switches 34 that have been activated by the float.

It is preferred that the system, as described above, have built into it some means of detecting and adapting to a failure of one or more of reed switches 34. If one of reed switches 34 should fail due to a short circuit, there is a danger that the system will no longer work below the short circuited reed switch, as the short circuited reed switch would be interpreted as reflecting the highest or top switch. To avoid this, the system can be altered to perform some form of verifying cross-check. For example, if none of the interpolation reeds were activated, the system could check to see if the reed switches just below the interpolation reeds were activated. If neither the interpolation reeds, nor the reeds switches just below the interpolation reeds were activated; the short circuited reed switch would be ignored as being an invalid signal and the system would continue to scan for an alternative highest or top reed that passed the verifying cross-check.

It will be apparent to one skilled in the art that the above described method enables the precise positioning of the float to be determined relative to the reed switches within a selected degree of accuracy, in the illustrated case 0.25 of an inch. This degree of accuracy of 0.25 of an inch was obtained notwithstanding a 1 inch spacing between reed switches 34. This enables greater accuracy with fewer reed switches. It will also be apparent to one skilled in the art that modifications may be made to the illustrated embodiment without departing from the spirit and scope of the invention as hereinafter defined in the claims.

I claim:

1. A method of measuring a liquid level using a liquid level gauge having reed switches to determine a position of a magnetic float, comprising the steps of:

firstly, providing an elongate float having an axial bore defining a longitudinal axis, the float having a plurality of magnets axially spaced along the longitudinal axis to form at least two reed switch activating magnetic layers, the magnetic layers being in fixed relation to each other;

secondly, providing a tube having a first end, a second end, and a plurality of magnetically activated reed switches equally axially spaced from the first end to the second end, the tube extending through the axial bore of the float; and thirdly, determining which of the plurality of magnetically activated reed switches have been activated by each of the axially spaced magnetic layers of the float and interpolating float position in relation to the activated reed switches, such that the interpolated float position corresponds to the liquid level measured with the liquid level gauge even when said liquid level is positioned between reed switches.

2. The method of claim 1 in which the magnetically activated reed switches are spaced by an amount R, and the reed switch activating magnetic layers are spaced by an amount S equal to an integral multiple of R plus a fraction X of R.

3. The method of claim 2 in which the fraction X has the form 1/d where d is an integer corresponding to the number of reed switch activating magnetic layers.

4. A liquid level gauge, comprising:

an elongate float having an axial bore defining a longitudinal axis, the float having a plurality of magnets axially spaced along the longitudinal axis to form at least two reed switch activating magnetic layers, the magnetic layers being in fixed relation to each other;

a tube having a first end, a second end, and a plurality of magnetically activated reed switches equally axially spaced from the first end to the second end, the tube extending through the axial bore of the float;

means for determining which of the plurality of magnetically activated reed switches have been activated by each of the axially spaced magnetic layers of the float;

computing means for interpolating float position in relation to the activated reed switches, such that the interpolated float position corresponds to the liquid level measured with the liquid level gauge even when said liquid level is between reed switches.

5. The liquid level gauge of claim 4 in which the magnetically activated reed switches are spaced by an amount R, and the reed switch activating magnetic layers are spaced by an amount S equal to an integral multiple of R plus a fraction X of R.

6. The liquid level gauge of claim 5 in which the fraction X has the form 1/d where d is an integer corresponding to the number of reed switch activating magnet layers.

* * * * *